United States Patent [19]

Fischer et al.

[11] Patent Number: 5,209,334
[45] Date of Patent: May 11, 1993

[54] CLUTCH DISC

[75] Inventors: Matthias Fischer, Eltingshausen; Harald Jeppe; Gerda Rudolph, both of Schweinfurt, all of Fed. Rep. of Germany

[73] Assignee: Fichtel & Sachs AG, Schweinfurt, Fed. Rep. of Germany

[21] Appl. No.: 755,654

[22] Filed: Sep. 6, 1991

[30] Foreign Application Priority Data

Sep. 8, 1990 [DE] Fed. Rep. of Germany ....... 4028616

[51] Int. Cl.5 .......................... F16D 13/64; F16D 3/14
[52] U.S. Cl. .................................... 192/106.2; 464/68
[58] Field of Search ........................ 192/106.2; 464/68

[56] References Cited

U.S. PATENT DOCUMENTS

| 3,266,271 | 8/1966 | Stromberg | 192/106.2 X |
| 3,931,876 | 1/1976 | Beeskow et al. | 192/106.2 |
| 4,643,288 | 2/1987 | Tomm et al. | 464/68 X |
| 4,787,877 | 11/1988 | Nagao et al. | 192/106.2 X |
| 4,789,053 | 12/1988 | Fischer et al. | 192/106.2 |
| 4,890,712 | 1/1990 | Maucher et al. | 192/106.2 |

FOREIGN PATENT DOCUMENTS

| 3228515 | 2/1984 | Fed. Rep. of Germany . |
| 3545723 | 6/1987 | Fed. Rep. of Germany ... 192/106.2 |
| 2503295 | 10/1982 | France . |

Primary Examiner—Rodney H. Bonck
Attorney, Agent, or Firm—Anderson Kill Olick & Oshinsky

[57] ABSTRACT

A clutch disc with torsional vibration damper is proposed in which synthetic plastics material guide parts are arranged between a hub disc protruding from a hub and two side discs arranged axially on both sides of the hub disc, which guide parts, stressed axially by a spring, fix the side discs axially on the hub disc and guide them radially on the hub, by means of formed-on collars. The guide parts are coupled rotationally elastically through springs of an idling damper with the hub disc and at the same time determine the friction moment in idling.

18 Claims, 7 Drawing Sheets

CLUTCH DISC

BACKGROUND OF THE INVENTION

The invention relates to a clutch disc for a motor vehicle friction clutch.

Clutch discs for motor vehicle friction clutches are known from DE-A-3,228,515 and FR-A-2,503,295, which in each case comprise a torsional vibration damper dimensioned for idling operation and a torsional vibration damper dimensioned for operation under load. The under-load damper comprises a disc element protruding substantially radially from a hub of the clutch disc and two side discs arranged on axially opposite sides of the disc element, firmly connected with one another and rotatable about the rotation axis of the hub in relation to the disc element, one of which side discs forms a friction lining carrier of the clutch disc. In windows of a radially outer part of the disc element for the one part and of the two side discs for the other part there are arranged first springs dimensioned for operation under load, which couple the side discs rotationally elastically with the outer part of the disc element. The idling damper comprises second springs arranged in windows of a radially inner part of the disc element and dimensioned for idling operation, which couple the radially inner part of the disc element rotationally elastically with the torque transmission path of the under-load damper. In the clutch disc according to DE-A-3,228,515 the radially inner part and the radially outer part of the disc element are connected to form a one piece hub flange, so that the springs of the idling damper are stressed not only in idling operation but also in under-load operation. In the clutch disc according to FR-A-2,503,295 the radially outer part of the disc element is coupled through a toothing with play in rotation to the radially inner part, namely so that the idling damper is bridged over after compensation of the play in rotation. The idling damper is here placed in series with the under-load damper. The known clutch discs each have friction means dimensioned for under-load operation.

SUMMARY OF THE INVENTION

The invention provides a clutch disc which is of simple construction type and the torsional vibration damper of which comprises friction means both for under-load operation and for idling operation.

The invention takes commencement from a clutch disc for a motor vehicle friction clutch which possesses the following features:

A hub concentric with a rotation axis, with a substantially radially protruding disc element, two side discs arranged on axially opposite sides of the disc element, firmly connected with one another and rotatable about the rotation axis in relation to the disc element, one of which side discs forms a friction lining carrier, several first damper springs held in windows of a radially outer part or portion of the disc element on the one hand and of the two side discs on the other hand and dimensioned for under-load operation, which couple the side discs rotationally elastically with the outer part of the disc element, two annular guide parts arranged on axially opposite sides of the disc element but between the side discs and rotatable in relation to the hub and to the side discs, several second damper springs dimensioned for idling operation, arranged in windows of a radially inner part or portion of the disc element connected fast with the hub, on the one hand, and arranged in apertures of the two guide parts on the other hand, which couple the radially inner part of the disc element rotationally elastically with the guide parts, and first friction means dimensioned for operation under load and effective between the side discs and the disc element.

Starting from such a clutch disc, the improvement according to the invention is characterised in that the guide parts are supported through second friction means dimensioned for idling operation on the radially inner part of the disc element, and axially fix the side discs on the radially inner part of the disc element, and thus on the hub.

A clutch disc of this kind makes a low number of components suffice, and the guide parts are exploited for several functions at the same time. They ensure the controlling of the damper springs of the idling range and guide the side discs in relation to the hub. At the same time they generate a damping friction moment, at least in idling operation. The radially inner part and the radially outer part of the disc element protruding from the hub can, as in the case with the clutch disc of FR-A-2,503,295, consist of two hub disc parts arranged coaxially one within the other and coupled with one another with play in rotation through a toothing; the radially inner and the radially outer parts of the disc element can however, analogously with DE-A-3,228,515, be connected integrally to form a hub disc.

In a preferred development in which the number of the components required for the clutch disc is especially low, the two guide parts are identical. One arrives at especially simple configurations if the guide parts are formed as synthetic plastics material castings produced for example by the extrusion method and these castings at the same time form friction faces at least of the second friction means dimensioned for idling operation. The friction faces of the second friction means can be formed by an elevation of the axial end face, adjacent to the disc element, of the guide parts. This has the advantage that the size and the effective radius of the friction faces effective in idling operation can more easily be varied in the design of the clutch disc.

In a preferred development the guide parts, formed as synthetic plastics material casting, have a collar facing away from the disc element, on which collar the adjacent side disc in each case is radially mounted. The guide parts thus at the same time take over the radial mounting of the side discs and thus of the friction lining carrier.

The apertures of the guide parts, intended for the coupling with the second damper springs, are expediently formed as pockets which are closed towards the adjacent side disc in each case. This has the advantage that the idling springs for the one part are seated in protected manner axially between the guide parts, and on the other hand the outer faces of the guide parts can be exploited better for the axial supporting and friction moment generation against the side discs.

In a preferred configuration an axially acting spring is arranged axially between one of the guide parts and the side disc adjacent to this guide part, which spring both initially stresses the other side disc firmly connected with this side disc against the other of the two guide parts, and initially stresses both guide parts against the radially inner part of the disc element. Such a design has the advantage that with one single axially acting spring it is possible both to determine the friction moment effective in idling operation and to fix the side discs axially in relation to the hub. According to the configuration of the friction means dimensioned for the under-load operation this axially acting spring can also be exploited for the generation of the under-load friction moment.

In an especially simple development of the invention the radially inner part and the radially outer part of the disc element are formed by a one-piece hub disc firmly connected with the hub, each of the guide parts being connected fast in rotation with the disc part adjacent to it. In this configuration it is ensured that the relative movement between the input parts and output parts of the clutch disc occurs only on the sliding faces between the guide parts for the one part and the hub or hub disc for the other part. If guide parts of synthetic plastics material are used, an especially low basic friction results.

If the guide parts should be used at the same time for the generation of the under-load friction moment or at least for the transmission of the axial force of the friction means provided for this purpose, then the friction means dimensioned for under-load operation expediently comprise at least one friction control disc arranged axially between one of the side discs and the guide part adjacent thereto and rotatable in relation to the side discs, which control disc, in order to generate a friction moment jump, engages with axially bent-over lugs in the circumferential direction laterally of the terminal ends of at least one of the first damper springs in the window of the hub disc allocated to this first damper spring. In this way with few individual parts it is possible to achieve a multi-stage friction characteristics, the friction means being controlled in dependence upon rotation angle by the lugs for the one part and by the under-load damper springs for the other part.

In order to enlarge the friction moment jump in a simple manner, friction control discs can be provided on axially both sides of the hub disc. The two friction control discs are expediently connected fast in rotation with one another through axially angled-off lugs. Such a design makes one single axially acting spring, preferably formed as corrugated spring, suffice.

In so far as the lugs provided for the rotation-fast connection of the two friction control discs are provided with stop shoulders by means of which the friction control discs can support themselves axially on one another, different axially acting springs can be provided for the under-load operation for the one part and the idling operation for the other part. In this way the friction moment difference between idling operating and under-load operation can be further enlarged.

While in the case of guide parts connected fast in rotation with the side discs the idling damper springs are effective in the angle of rotation range of the under-load damper springs too, due to the fact that the guide parts for the one part take over the function of the above-explained friction control discs and for the other part are rotatable in relation to the side discs, what are called bridged-over idling dampers can be provided. The guide parts, which are rotatable both in relation to the radially inner part of the disc element and in relation to the side discs comprise at least one pair of radially outwardly protruding control noses which, by pairs in each case, each enclose one of the first damper springs between them, these first damper springs being arranged without play in the circumferential direction in the windows of the side discs and between the pair of noses, while a play in the circumferential direction corresponding to the angle of rotation of the idling operation range is provided in the window of the disc element. The windows of the under-load damper springs, in the side discs, enlarged in the circumferential direction effect a play in rotation in the torque transmission path of the under-load damper springs, within which the friction moment generated due to the abutment contact generated between the guide parts and the side discs and dimensioned for operation under load increases in the relative rotation between side discs and hub. After the compensation of this play in rotation the force of the idling damper springs or possibly additional stops ensures a bridging over of the idling damper. With this kind of bridged-over idling damper the radially inner part and the radially outer part of the disc element can again be a one-piece hub disc firmly connected with the hub.

In the configuration as explained above the guide parts are expediently made as sheet metal bodies jacketed with synthetic plastics material by extrusion, the sheet metal body co-operating both with the terminal ends of the under-load damper springs and also of the idling damper springs. In this way the guiding properties of the guide parts can be improved and a better wear behaviour results at the contact points of the springs. The sheet metal body is expediently used for the formation of a friction face for the under-load friction means.

The various features of novelty which characterise the invention are pointed out with particularity in the claims annexed to, and forming part of, this disclosure. For a better understanding of the invention, its operating advantages and specific objects attained by its use, reference should be had to the accompanying drawings and descriptive matter in whcih there are illustrated and described preferred embodiments of the invention.

BRIEF DESCRIPTION OF THE DRAWINGS

FIG. 7b shows a sectional view of the friction control disc, seen along a line VII—VII in FIG. 7a;

FIG. 7c shows a detail view of the friction control disc, seen in the direction of an arrow A in FIG. 7a;

DESCRIPTION OF PREFERRED EMBODIMENTS

Figures 1, 2:
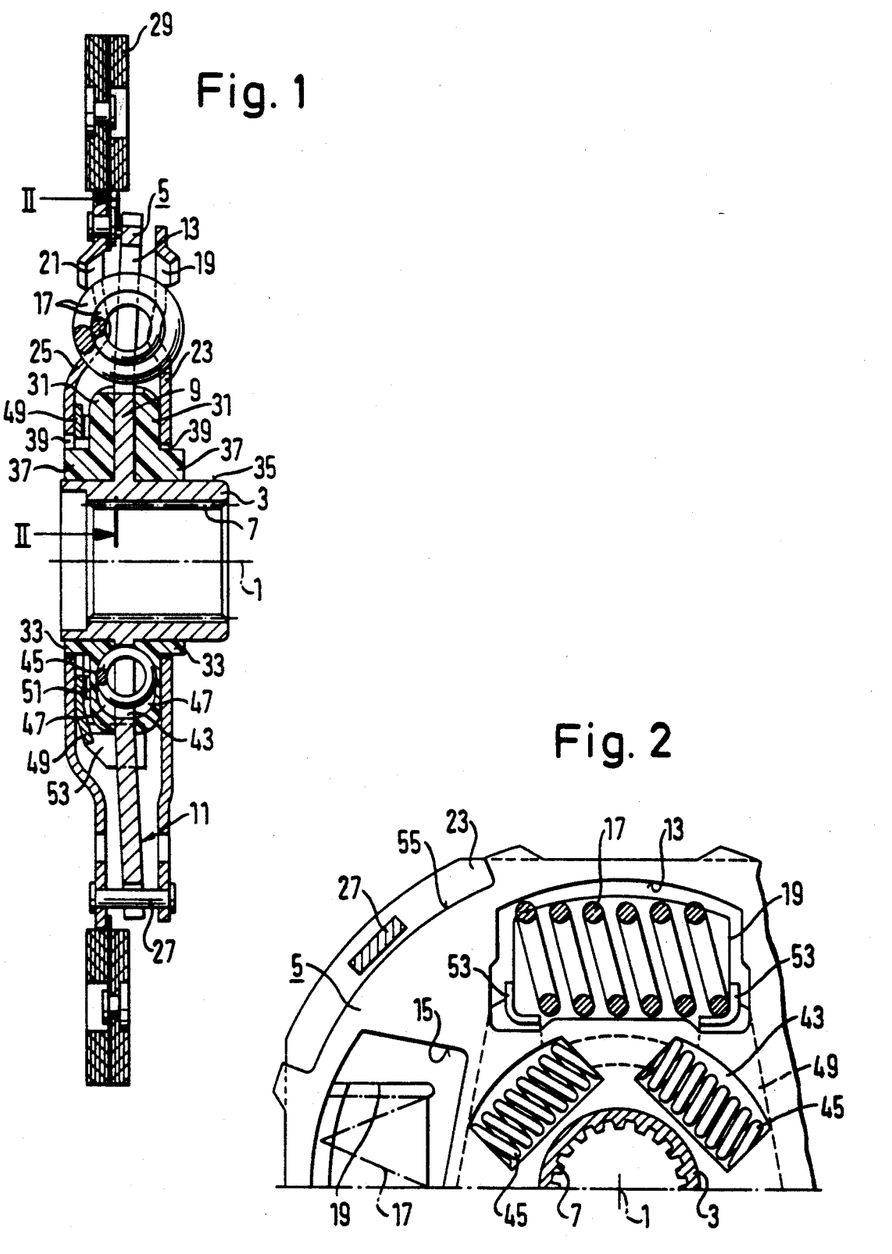
FIG. 1 shows an axial longitudinal section through a clutch disc in accordance with the invention, for a motor vehicle friction clutch.
FIG. 2 shows a partial sectional view of the clutch disc, seen along a line II—II in FIG. I.
Figure 3A:
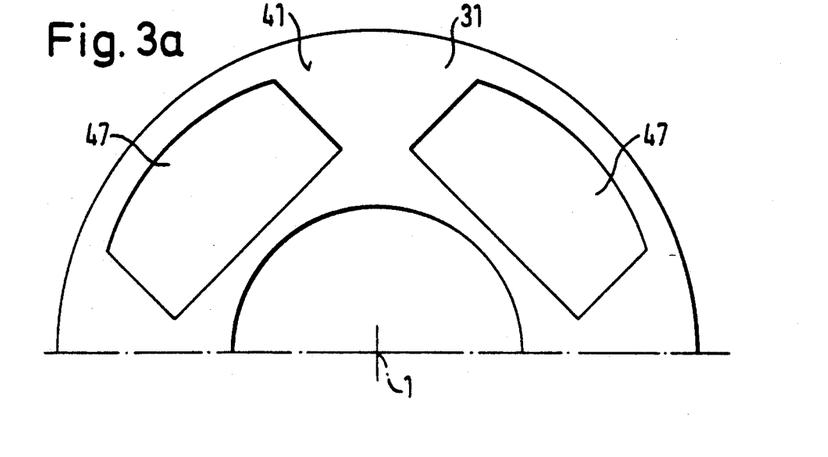
FIGS. 3a, 3b and 3c show a partial front view, a sectional view and a partial rear view of a guide part of the clutch disc.
Figure 3B:
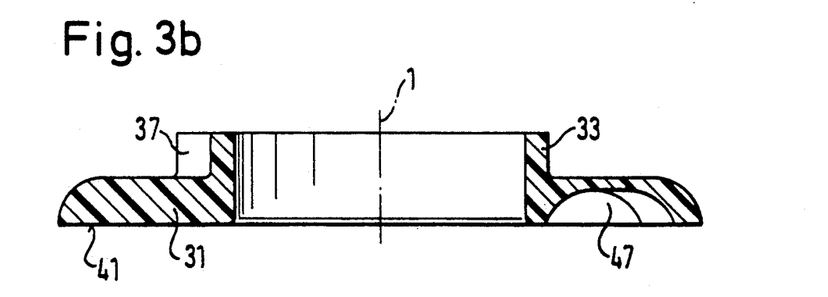
Figure 3C:
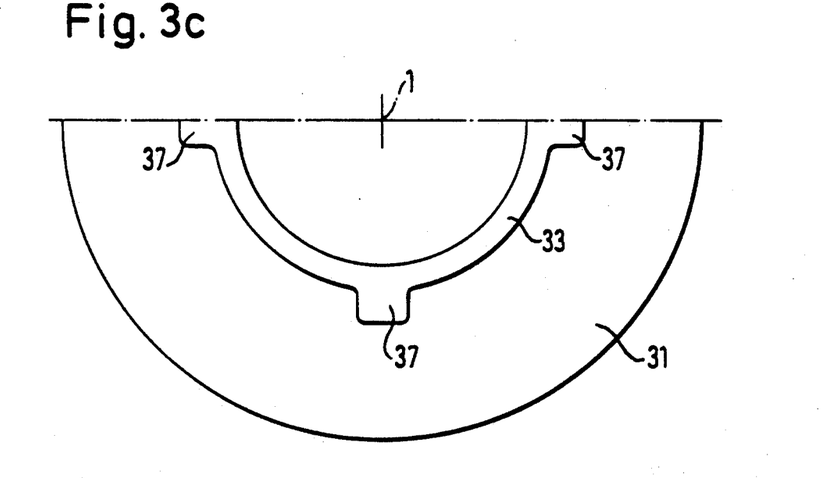

The clutch disc illustrated in FIG. 1 as a whole and in FIGS. 2 and 3 with details comprises a hub 3 symmetrical in rotation to a rotation axis 1, from which hub a fixedly fitting hub disc 5 extends radially outwards. The hub 3 has an internal toothing 7 for seating fast in rotation on a gear input shaft (not illustrated further). The hub disc 5 comprises a radially inner part 9 of disc form and a radially outer part 11 of disc form integrally adjoining it. In the radially outer part 11 helical compression springs 17 are arranged in windows 13,15, which springs engage in axially aligned windows 19, 21 of two disc parts 23, 25, which are arranged axially on both sides of the hub disc 5, rotatably in relation thereto. The disc parts 23, 25 are connected fast in rotation with one another and held with axial spacing, by connection rivets 27. The side disc 25 forms a friction lining carrier and is provided with clutch friction linings 29. The springs 17 couple the side discs 23, 25 rotationally elastically with the hub disc 5 and thus the hub 3.

Identical guide parts 31 formed as synthetic plastics castings are arranged axially between the side discs 23, 25. The guide parts 31 have an annular form and are seated, with an annular collar 33 protruding from the hub disc 5 axially to the adjacent side disc 23 or 25, rotatably each on a cylindrical outer guide surface 35 of the hub 3. The side discs 23, 25 are each guided radially on the collar 33 of the adjacent guide part 31 and connected, through noses 37 protruding radially from the collar 33, which noses engage in apertures 39 of the side discs 23, 25, fast in rotation with the guide part 31, without play in the circumferential direction.

The guide parts 31 extend radially in the region between the hub 3 and the springs 17 to close to the springs 17. They lie with an end face 41 normal to the axis (FIG. 3b) against the hub disc 5, in its radially inner part 9. Axially between the guide parts 31 the hub disc 5 has windows 43 in which helical springs 45 of a torsional vibration damper dimensioned for idling operation engage. The springs 45 engage in pockets 47 of the guide parts 31 and couple the guide parts 31, connected fast in rotation with the side discs 23, 25, rotationally elastically with the hub disc 5 and thus the hub 3. The pockets 47 are closed to the side discs 23, 25, so that the springs 45 are accommodated in protected manner. The springs 45 are less stoutly dimensioned than the springs 17 of the under-load vibration damper.

Between one of the side discs, here the side disc 25 serving as friction lining carrier, and the axially adjacent guide part 31 there is arranged an annular control disc 49 formed as sheet metal shaped part, which is stressed into frictional contact with the side disc 25 by an axially acting spring, for example a corrugated spring 51 arranged between the control disc 49 and the axially adjacent guide part 31. The corrugated spring 51 is here supported through the guide parts 31 and the hub disc 5 arranged therebetween on the opposite side disc 23. The side disc 23 here lies directly against the guide part 31. From the control disc 49 at least in the region of one of the springs 17, two lugs 53 protrude, which, when the vibration damper is in the state of rest, abut on the ends of this spring 17. The lugs 53 extend moreover into the window 13 of the hub disc 5, for which this window 13 is enlarged in the circumferential direction by the material thickness of the lugs 53.

While all windows 19, 21 in the side discs 23, 25 are so dimensioned that they hold the springs 17 substantially without play or with slight initial stress between their ends, the windows 13, 15 in the hub disc 5 are made of different lengths in the circumferential direction. At least the window 13 of that spring 17 which co-operates with the control disc 49 is larger in the circumferential direction by an amount which corresponds to the idling action range of the springs 45. The other windows of the hub disc 5, for example the window 15, are still larger in the circumferential direction, so that the springs 17 arranged therein come into use after a still larger angle of rotation and thus a clutch disc spring characteristic curve with multiple angles is achieved. The maximum rotation range is limited by the connection rivets 27 which, as shown by FIG. 2, engage in radially open apertures 55 of the hub disc 5.

The torsional vibration damper of the clutch disc works as follows: on torque charging of the side discs 23, 25 through the friction linings 29, the side discs 23 rotate about the rotation axis 1 in relation to the hub 3. The rotation-fast connection between the guide parts 31 and the side discs 23, 25 ensures that the guide parts 31 are entrained over the whole angle of rotation, and the springs 45 are compressed, so that after travelling through the idling angle range they are also effective in the under-load angle range parallel to the springs 17. Within the idling range, that is as long as the ends of the springs 17 do not abut on the control edges of the windows 13 placed in the circumferential direction, the control disc 49 moves together with the spring 17 controlling them, and the side discs 23, 25. Here a friction moment is generated only between the two guide parts 31 and the hub disc 5, the magnitude of which friction moment is also determined by the force of the spring 51 stressing the guide parts 31 against the hub disc 5. Since the guide parts 13 consist of synthetic plastics material, the friction moment is relatively low. Moreover it is also possible to take influence upon the friction moment in that for example in accordance with FIG. 8 it is not the whole area of the guide parts, but only a limited region, which rests on the hub disc. After passing over the idling range the end face of the spring 17 and at the same time the lug 53, abutting on this end face, of the control disc 49 comes to abut on the neighbouring control edge, in the circumferential direction, of the window 13. Thus after transition into the under-load region the control disc 49 is held fast by the hub disc 5. The side discs 23, 25 and the two guide parts 31, with growing loading, are further rotated in relation to the hub and successively charge the other spring 17 as also the springs 45, as before.

While in the idling rotation range the friction between the hub disc 5 and the guide parts 31 resting on it is exclusively effective, the control disc 49 held fast by the hub disc 5 increases the friction moment in the under-load range. This moment is then composed of the friction between the guide parts 31 and the hub disc 5 and of the friction between the control disc 49 and the side disc 25 or the spring 51 and the guide part 31 resting against the spring 51. Since the control disc 49 consists of metal and the guide part 31 of synthetic plastics material, the spring 51 is held by friction force fast in rotation on the control disc 49, and will slide in relation to the guide part 31.

With the torque charging decreasing and thus the side discs 23, 25 turning back in relation to the hub disc 5, the control disc 49 will be held by the initial stress of the helical spring 17 allocated to it in a position fast in rotation in relation to the hub disc 5, until the helical spring 17 again lies substantially relaxed in the windows 19, 21 of the side discs 23, 25, in order then, on torque reversal, to lift away from the previously charged control edge of the window 13 of the hub disc 5. The principle of function is the same for both directions of rotation but admittedly for the idling rotation range, starting from a rest position different sized angles can be provided, as may be seen by way of example in FIG. 2.

Variants of the clutch disc as explained with reference to FIGS. 1 to 3 will be described hereinafter. Components of like effect are designated by the reference numerals of FIGS. 1 to 3, and provided with a letter for distinction. For the description of the construction and the manner of operation reference is made to the description of FIGS. 1 to 3.

Figure 4:
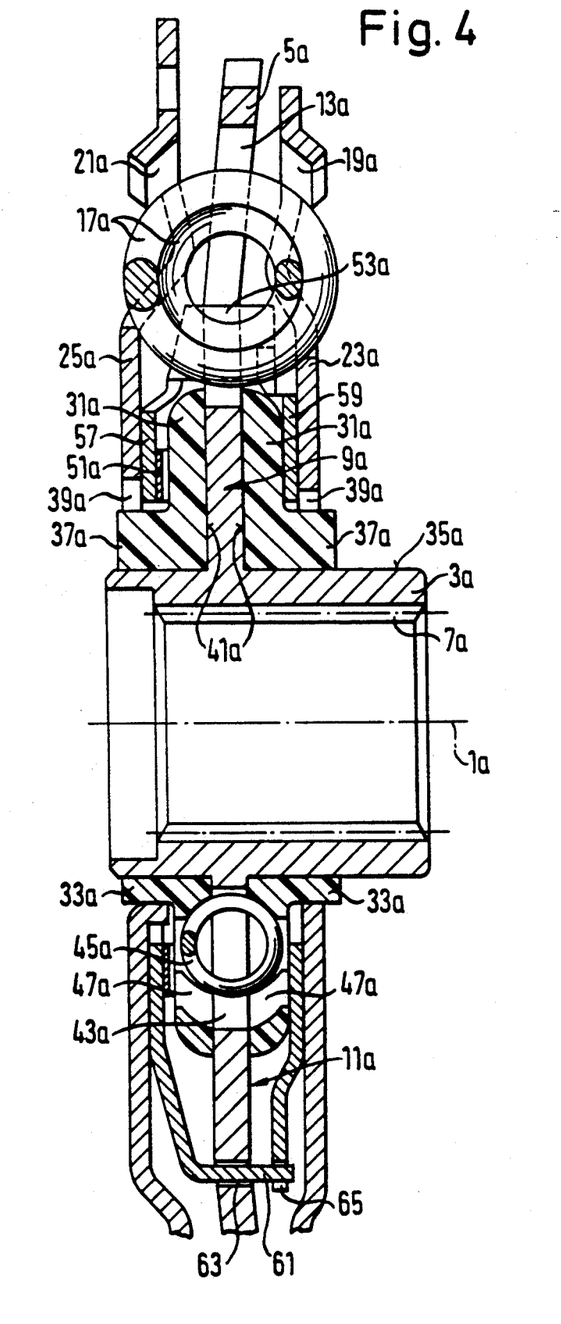
FIG. 4 shows an axial longitudinal section through a variant of the clutch disc.

FIG. 4 shows a clutch disc which is distinguished from the clutch disc according to FIG. 1 primarily in that on both sides of the hub disc 5a control discs 57,59 are arranged in each case axially between one of the guide parts 31a and the adjacent side disc 23a or 25a. The components 15, 27, 29 from FIG. 1 are not illustrated, although they are present.

The control discs 57, 59 correspond to the control disc 49 and lie in frictional contact against the side discs 23a, 25a. From the control disc 57 lugs 61 stand away axially which penetrate the hub disc 5a in slots 63 and engage in apertures 65 of the control disc 59.

The lugs 61 couple the two control discs 57, 59 fast in rotation without play in the circumferential direction with one another. The friction force in the idling range and in the under-load range is again determined by the common axially acting spring 51a. The pairs of lugs 53a co-operating with the ends of the springs 17a can be provided on one or even both control discs 57, 59. By the use of two control discs 57, 59 it is possible to increase the friction moment difference between idling range and under-load range. In the case of the clutch disc according to FIG. 4 again only one single spring 51a is necessary. The friction moment builds itself up in the idling range analogously with the the clutch disc according to FIG. 1 by relative movement between the two guide parts 31a and the hub disc 5a by reason of the axial loading by the spring 51a. In the under-load range to this basic friction between the guide parts 31a and the hub disc 5a there also comes the load friction, that is the friction between the control disc 57 and the side disc 25a forming the lining carrier, or the spring 51a, and the guide part 31a adjacent thereto and between the control disc 59 and the side disc 23a on the one hand and the here adjacent guide part 31a on the other hand. The actuation of the springs 17a and 45a corresponds to the conditions of the clutch disc according to FIG. 1.

Figure 5:
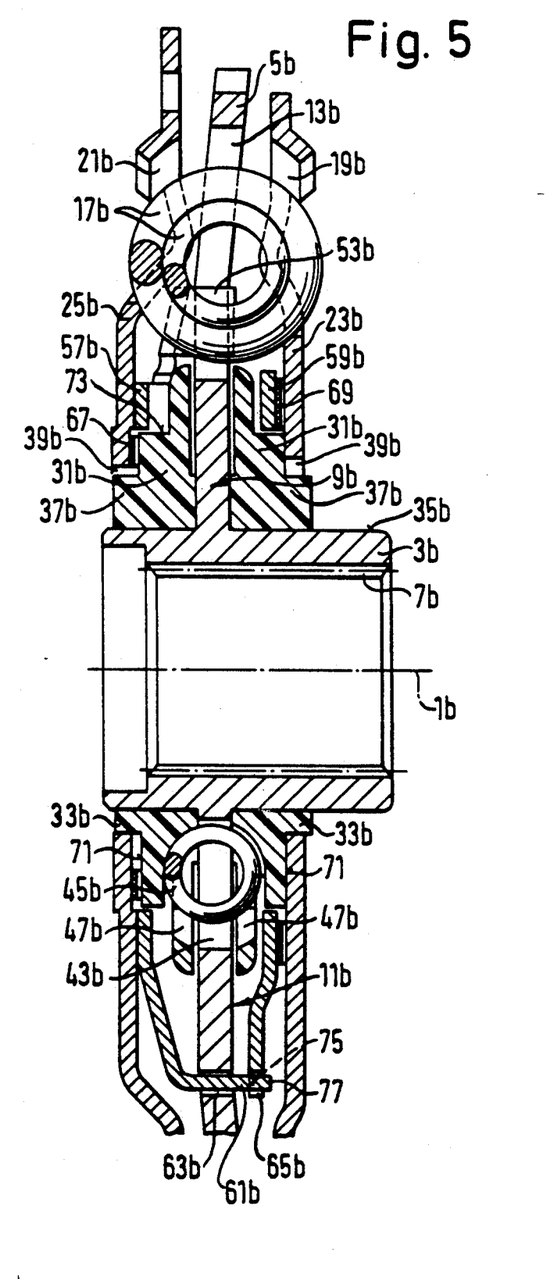
FIG. 5 shows an axial longitudinal section through a further variant of the clutch disc.

FIG. 5 shows a variant of the clutch disc according to FIG. 1 which, analogously with the clutch disc according to FIG. 4, comprises two control discs 57b, 59b. The control discs 57b, 59b for the one part and the guide parts 31b for the other are however, in departure from the clutch disc according to FIG. 4, stressed axially by separate, axially acting springs 67, 69. For the guidance of the control discs 57b, 59b and of the springs 67 and 69 the guide parts 31b have, adjoining the external diameter of the noses 37b, a radially proceeding surface 71 which, according to the installation situation of the clutch disc, serves either as friction surface for the side disc 23b or as abutment surface for the axially acting spring 67 initially stressed axially between the side disc 25b and the opposite guide part 31b. The external circumference of the surface 71 is adjoined by a step 73 on which the annular basic body of the control disc 57b or 59b, as the case may be, is radially guided. The axially acting spring 69 provided for the generation of the friction force for the under-load operation is arranged between one of the control discs, here the control disc 59b and the adjacent side disc 23b. The control disc 59b is supported on shoulders 75 of the axially bent-down lugs 61b, which extend from the control disc 57b through openings 63b of the hub disc 5b. For the rotation-fast connection the ends of the lugs between the stops 75 are provided with noses 77 which engage in the openings 65b of the control disc 59b. In this way the force of the spring 69 can be transmitted to the control disc 57b, which is supported with its basic body on the inner side of the side disc 25b.

The idling friction moment results from the force of the spring 67 for the one part and the friction between the guide parts 31b and the hub disc 5b for the other part. FIG. 5 shows how the friction moment can be influenced independently of a variation of the spring 67. The friction face region of the guide parts 31, which co-operates with the hub disc 5b, is formed so that direct contact takes place only in the radially inner region, and thus the effective friction radius can be kept small. On overstepping of the idling range the lugs 53b of the control discs 57b, 59b strike upon the edge of the window 13b of the hub disc 5b, provided for the under-load springs 17b, as was already explained above. With the striking both control discs 57b, 59b are held fast in relation to the hub disc 5b, so that now the control discs 57b, 59b rotate in relation to the side discs 23b, 25b. The friction force thereby produced is dependent upon the material pairing—metal on metal—of these discs and the force of the spring 69. In the under-load range the friction moment is thus determined by the friction already effective in the idling range, and additionally by the friction of the two control discs 57b, 59b. The design according to FIGS. 5 to 7 permits of adjusting the friction moments for the idling range and for the under-load range completely independently of one another.

Figure 6A:
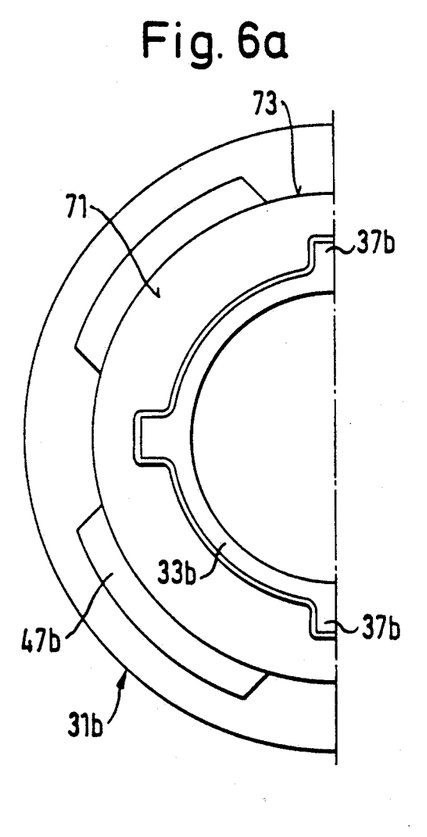
FIGS. 6a and 6b show a partial front view and a sectional view of a guide part of the clutch disc according to FIG. 5.
Figure 6B:
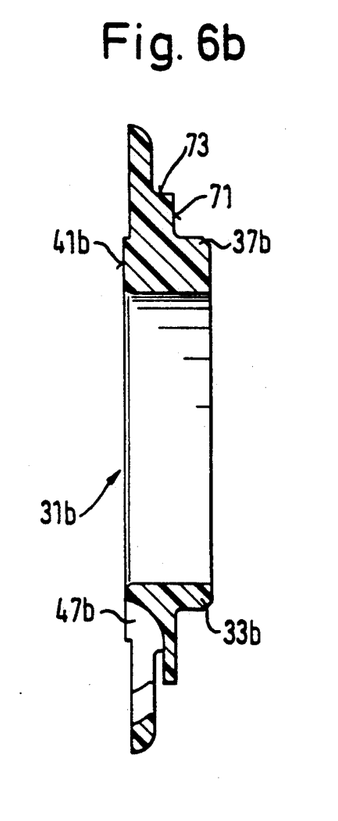
Figure 7A:
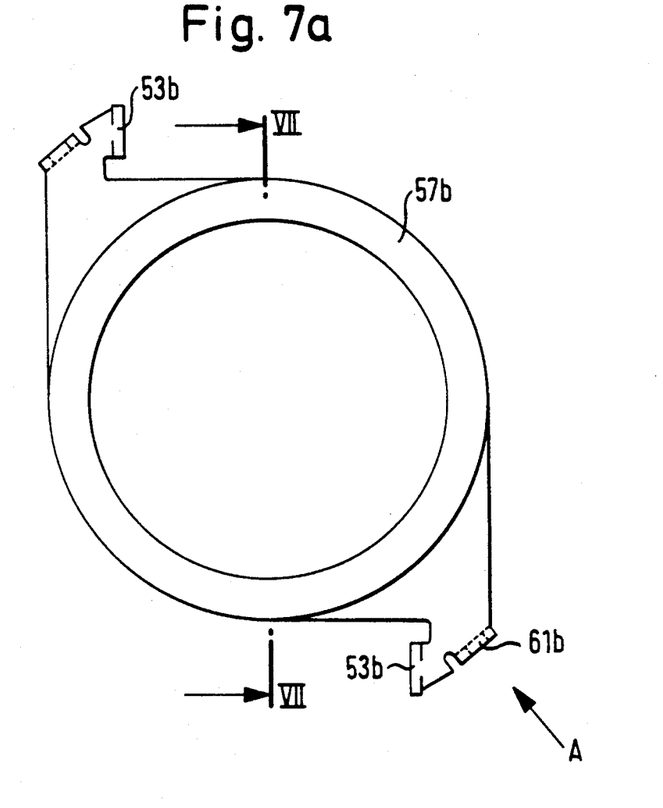
FIG. 7a shows a lateral view of a friction control disc of the clutch disc according to FIG. 5.
Figure 7B:
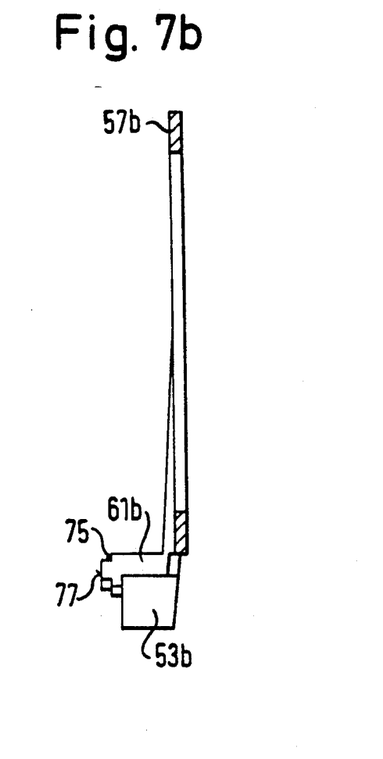
Figure 7C:
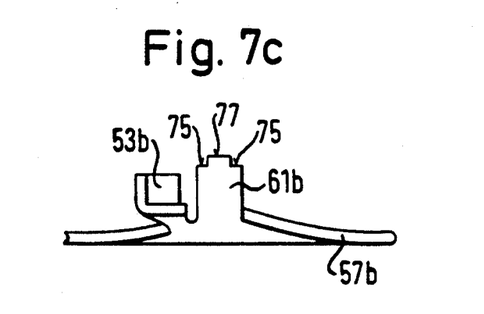

The clutch discs according to FIGS. 5 to 7 differ from the previously explained clutch discs further in the nature of the arrangement of the lugs 53b. which are provided only on the control disc 57b, while the control disc 59b is entrained by means of the lugs 61b by the control disc 57b. As shown best by FIG. 7a, two lugs 53b are provided which co-operate with two of the springs 17b only in one and the same direction of rotation. The lugs 53b lie at the same end in effect of the two springs 17b and these springs 17b are again arranged in mutually equal windows 13b of the hub disc 5b for the one part and mutually equal windows 19b, 21b of the side discs 23b, 25b for the other part. The friction force input in the under-load range is thus effective in only one direction of rotation, for example in the case of thrust stressing, while in the other direction of rotation it has no effect, because of the lack of lugs. If analogously with FIG. 2 it is assumed that the lugs 53b according to FIG. 7 are present only as lugs 53b effective in the counter-clockwise direction, then on torque charging of the side disc 23 according to FIG. 2 in the counter-clockwise direction with the hub 3 held fast, the additional friction for the under-load range will come into action when the springs 17 rest on the control edges of the windows 13 of the hub disc 5 which are arranged oppositely to the clockwise direction. With decreasing torque the additional friction moment of the two control discs 57b, 59b is maintained until the springs 17b lift away from the stop edges of the windows 13b. From this moment onwards the control discs 57b, 59b are entrained in frictional engagement by the side discs 23b, 25b and thus make no contribution to the friction force generation. It will be understood that, in modification of the construction according to FIG. 5, lugs 53b can also be provided for both directions of rotation; more especially the control lugs 53b for mutually opposite directions of rotation can be arranged on different control discs 57b and 59b.

Figure 8:
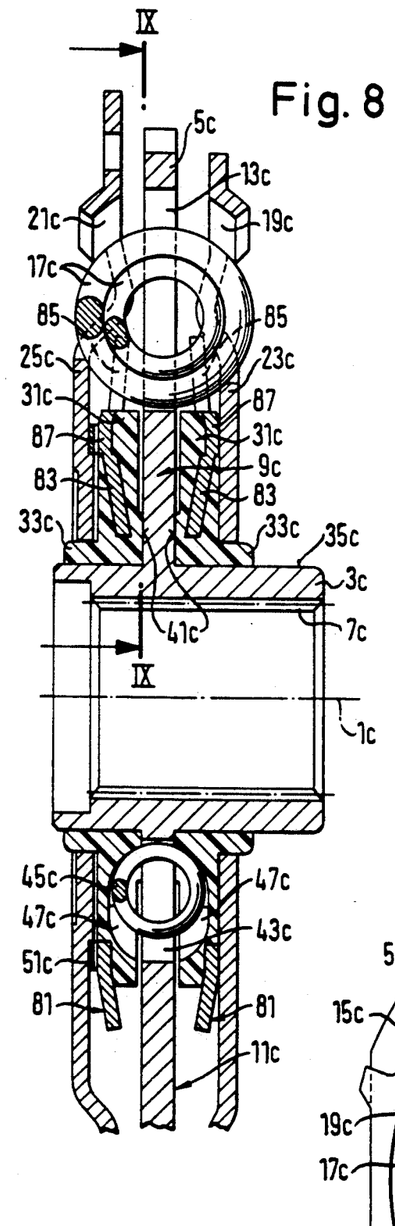
FIG. 8 shows an axial longitudinal section through a further variant of the clutch disc.
Figure 9:
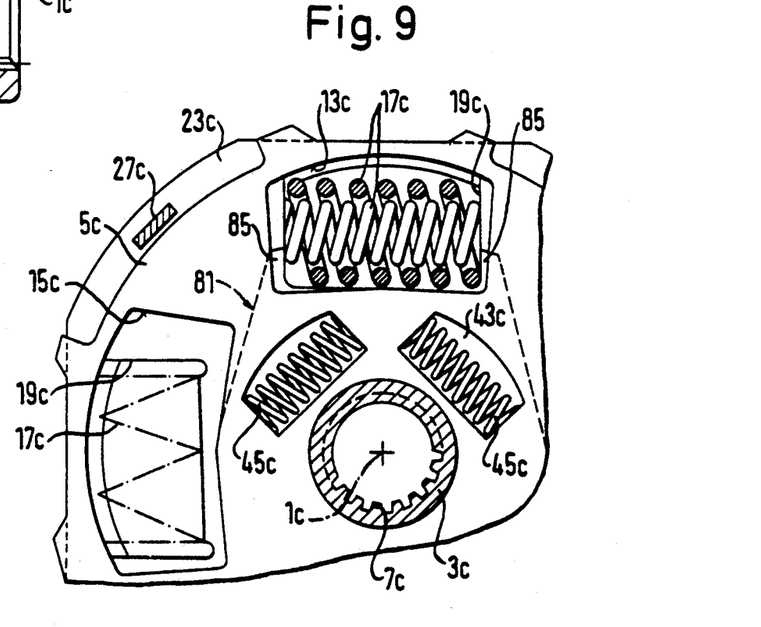
FIG. 9 shows a partial sectional view of the clutch disc, seen along a line IX—IX in FIG. 8.

FIGS. 8 and 9 show a further variant of a clutch disc which differs from the clutch discs as explained above essentially in that the guide parts 31c are united into one construction unit each with control discs 81 which correspond in their function to the control discs as explained hitherto, and this construction unit is rotatable both in relation to the hub disc 5c and in relation to the side discs 23c, 25c. The control discs 81 are again expediently made as metal castings, while the guide parts 31c are preferably synthetic plastics material shaped bodies which are especially injected on to the control discs 81.

In the clutch disc according to FIGS. 8 and 9 again the two guide parts 31c are mounted rotatably by means of axially protruding collars 33c on the outer jacket 35c of the hub 3c. The side discs 23c and 25c are supported radially on these collars 33c. The guide parts 31c are axially braced by a spring 51c, which is arranged between one of the construction units consisting of control disc 81 and guide part 31c and the adjacent side disc, here the side disc 25c. In the present case the spring is stressed in between the side disc 25c and an exposed region of the control disc 81. The control discs 81 have an annular basic body 83, which is jacketed by the material of the guide parts 31c, and they extend radially outwards over the synthetic plastics material in the form of noses 85, which in accordance with the lugs 53 explained above co-operate by pairs with at least one of the springs 17c of the under-load damper. The noses 85 lie in the circumferential direction without play on the ends of the spring 17c, when this is situated in its rest position, and here again the spring 17c is held with slight initial stress in the windows 19c, 21c of the side discs 23c, 25c. The guide parts 31c are again provided with pockets 47c for the reception of springs 45c of the idling damper. The springs 45c are moreover seated in windows 43c of the hub disc 5c. The basic bodies 83 of the control discs 81 are so formed that they form stop edges for the springs 45c in their radially inner region, which are aligned with the control edges formed by the pockets 47c and thus reinforce the control edges of the synthetic plastics material. The basic bodies 83 further form in their middle region friction faces for the abutment on the side disc 23c for the one part of the spring 51c for the other part. In order to render this possible the basic bodies 83 are made slightly convexly domed, seen from the exterior, so that they protrude with their middle region beyond the external contour of the guide parts 31c and are constricted radially inwards towards the hub disc for the formation of the control edges for the springs 45c. Likewise the control discs 81 are constricted in the region of the noses 85 towards the hub disc 5c, in order there also to grasp inner springs of the springs 17c. The regions of the control discs 81 intended for frictional contact have the form of a plurality of elevated portions 87 distributed in the circumferential direction, which are pressed out of the sheet metal material and protrude slightly from the synthetic plastics material of the guide parts 31c. It will be understood that the elevated portion can also be closed in annular form.

On torque charging in idling operation only the springs 45c will be compressed. The idling range corresponds to the difference between the opening width in the circumferential direction of the windows 19c, 21c, provided for the springs 17c, in the side discs 23c, 25c, for the one part, and the opening width in the circumferential direction, of the windows 13c in the hub disc 5c. It is understood that all windows of the hub disc 5c, which are provided for the reception of springs 17c of the under-load damper, must be dimensioned at least for this difference. In addition however windows 15c are also provided which are larger in the circumferential direction than are the windows 13c, so that the springs 17c arranged there come into action only after travelling through a larger angle of rotation. After travelling through the idling range and increasing compression of the springs 17c in the windows 13c, the guide parts 31c come to a halt in relation to the hub disc 5c, when the friction force built up between the guide parts 31c and the control discs 81 for the one part and the side discs 23c, 25c falls short of the initial stress force of the springs 45c. From this moment onwards only the friction force between the elevated portions 87 and the side disc 23c or the spring 51c is acting in the under-load range. The guide parts 31c then remain stationary in relation to the hub disc 5c. In the case of decreasing torque loading and subsequent rotation direction reversal, an analogous manner of functioning results.

In the idling range the friction moment is determined by the friction between the synthetic plastics material of the two guide parts 31c and the hub disc 5c, and again by the force of the spring 51c. The higher friction of the elevated portions 87 on the side disc 23c and on the spring 51c ensures the coupling of the guide parts 31c with the side disc 23c, 25c.

In order to render possible the use of friction for the under-load range independently of the condition of compression of the idling springs 45c, of course the noses 85 can be provided according to FIG. 2 with axially angled-off regions which engage in the windows 13c of the hub disc 5c.

Since in the clutch disc according to FIGS. 8 and 9, the guide parts 31c are not connected fast in rotation by shape engagement with the side discs 23c, 25c, the friction force builds up after the style of a bridged-over idling damper that is in the idling range only the friction between the synthetic plastics material of the guide parts 31c and the hub disc 5c is effective, while in the underload range only the friction between the control discs 81 and the side disc 23c or the spring 51c is effective.

In all the clutch discs as explained above the side discs are guided exactly both axially and radially in relation to the hub, by means of the guide parts. By the use of synthetic plastics material for the guide parts a production at acceptable price is possible, and furthermore the friction force occurring with this sliding friction is kept to a low value suitable for idling operation. The guide parts are in each case identical, so that production and storekeeping are at economical price and installation involves no problems.

While specific embodiments of the invention have been shown and described in detail to illustrate the application of the inventive principles, it will be understood that the invention may be embodied otherwise without departing from such principles.

What we claim is:

1. A clutch disc for a motor vehicle friction clutch, comprising:

a hub element which is concentric with a rotational axis and having a disc element wherein said disc element is fixedly connected to said hub element and further wherein said disc element projects radially from said hub element;

a plurality of side disc elements including at least a first side disc element and a second side disc element wherein one of said side disc elements forms a friction lining carrier and wherein said side disc elements are fixedly connected with each other and wherein said side disc elements are rotatable about said rotational axis relative to said disc element;

a plurality of first damping springs which are dimensioned for operation under load wherein said first damping springs are retained in windows located in an outer portion of said disc element and between said side disc elements wherein said first damping springs couple said disc elements in a torsionally elastic manner with an outer portion of said disc element;

a plurality of guidance elements including at least a first guidance element and a second guidance element wherein said guidance elements are arranged at opposite sides of said disc element and between said side disc elements wherein said guidance elements are rotatable relative to said hub element;

and further wherein said guidance elements are annularly-shaped and constructed of a plastic material molded part and further wherein said guidance elements rest axially at an inner portion of said disc element;

a plurality of second damping springs arranged in windows of said inner portion of said disc element and in recesses of said guidance elements wherein said second damping springs are dimensioned for operation in an idling range, and further wherein said second damping springs couple said inner portion of said disc element in a torsionally elastic manner with said guidance elements;

a first friction means which is dimensioned for an under load operation and which is located between at least one of said side disc elements and said disc element;

a second friction means which is dimensioned for an idling operation wherein said second friction means utilizes side faces of said guidance elements in contact with said disc element; and an axially acting spring which is arranged between a first guidance element and a first side disc element adjoining said first guidance element, wherein said axially acting spring serves to preload a second side disc element, which is fixedly connected to said first side disc element, against a second guidance element and further wherein said axially acting spring serves to preload said first and said second guidance elements against said inner portion of said disc element for fixing said first and second side disc elements to said hub element.

2. The clutch disc of claim 1, wherein said first and second guidance elements are identical.

3. The clutch disc of claim 1, wherein said friction faces of said second friction means are formed by an elevated portion of an axial end face of said first and second guidance elements, adjacent to said hub disc element, of the guide parts.

4. The clutch disc of claim 1, wherein each of said guidance elements comprises a collar which points away from said hub disc element, and further wherein each of said side disc elements is radially mounted on one of said collars.

5. The clutch disc of claim 1, wherein said recesses of said first and second guidance elements are formed as pockets which are closed towards said side disc elements which are adjacent thereto.

6. The clutch disc of claim 1, wherein said inner part and said outer part of said hub disc element are formed in a single hub disc element and are firmly connected with said hub element, and wherein each of said guidance elements are non-rotatably connected with said side disc elements adjacent thereto.

7. The clutch disc of claim 6, wherein said first friction means comprises at least one friction control disc arranged axially between one of said side disc elements and one of said first and second guidance elements adjacent thereto, wherein said control disc is rotatable in relation to said one side disc element and further wherein said control disc engages with axially bent-over lugs in a circumferential direction laterally of the ends of at least one of the first damping springs in said window of said hub disc element which corresponds to said first damping spring.

8. The clutch disc of claim 7, wherein friction control discs are provided which include a first friction control disc and a second friction control disc on both sides of said hub disc element and wherein lugs protrude axially from said first friction control disc which lugs engage in openings of said second friction control disc and connects said first and said second friction control discs non-rotatably with one another.

9. The clutch disc of claim 8, wherein said friction control discs lie in a force path of said axially acting spring arranged axially between said first side disc element and said first guidance element.

10. The clutch disc of claim 9, wherein each of said guidance elements comprises an axially protruding collar on which said side disc elements are radially guided, said collar engaging in apertures of said side disc elements, and wherein noses protrude radially outwards for non-rotatable connection of the collars to said side disc elements, and wherein said axially acting spring is arranged axially between one of the said friction control discs and said first guidance element.

11. The clutch disc of claim 8, further comprising stop shoulders by way of which said friction control discs are axially supported on one another and wherein, in addition to said axially acting spring arranged axially between said first guidance element and said first side disc element, a second axially acting spring is located axially between one of said friction control discs and an adjacent one of said side disc elements.

12. The clutch disc of claim 11, wherein each of said first and second guidance elements comprises an axially protruding collar on which one of said side disc elements is radially guided, and wherein noses protrude radially outwards from each collar and engage in apertures of said adjacent side disc element and further wherein each of said collars is adjoined by a stop face which extends normally to said rotational axis and on which, on one side of said hub disc element, between said first guidance element and said first side disc element said axially acting spring is located, and on the other side of said hub disc element, said second side disc element there abuts, and further wherein a guide step adjoins each of said stop faces and wherein said friction control discs and a second axially acting spring are radially guided on the guide steps.

13. The clutch disc of claim 1, wherein said guidance elements are rotatable both in relation to said inner portion of said hub disc element and in relation to said side disc elements and further wherein said guidance elements comprise at least one pair of outwardly protruding noses which enclose one of said first damping springs thereinbetween, wherein said first damping springs are arranged without play in a circumferential direction in windows of said side disc elements and are arranged between said pair of protruding noses and arranged with a play corresponding to an angle of rotation of an idling operation range, in circumferential direction, in said window of the said hub disc element.

14. The clutch disc of claim 13, wherein said guidance elements are constructed of a synthetic plastic material casting and rest on said inner portion of said hub disc element and further wherein said noses form a part of a sheet metal body, held on said synthetic plastic material casting.

15. The clutch disc of claim 14, wherein said sheet metal body is formed as an annular disc part from which said noses protrude outwards and which, for the formation of a friction face of said first friction means, protrudes axially, in a region placed radially between said first damping springs and said hub element, to an adjacent one of said side disc elements over said synthetic plastic material casting.

16. The clutch disc of claim 15, wherein said sheet metal body is bent towards said hub disc element radially on both sides of said friction face.

17. The clutch disc of claim 15, wherein said friction face is formed by a plurality of elevated portions distributed in a circumferential direction and pressed out of said sheet metal body.

18. The clutch disc of claim 15, wherein said recesses of said guidance elements have control edges for said second damping springs, which are limited by said synthetic plastic material casting and said sheet metal body.

* * * * *